(12) United States Patent
Della Rovere et al.

(10) Patent No.: US 9,821,627 B2
(45) Date of Patent: Nov. 21, 2017

(54) AIR-CONDITIONING SYSTEM FOR A MOTOR VEHICLE

(71) Applicant: Halla Visteon Climate Control Corp., Daejeon (KR)

(72) Inventors: Roberto Della Rovere, Kerpen (DE); Marc Graaf, Krefeld (DE); Navid Durrani, Kerpen (DE)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/770,846

(22) PCT Filed: Oct. 1, 2014

(86) PCT No.: PCT/IB2014/064985
§ 371 (c)(1),
(2) Date: Aug. 27, 2015

(87) PCT Pub. No.: WO2015/049642
PCT Pub. Date: Apr. 19, 2015

(65) Prior Publication Data
US 2016/0207371 A1      Jul. 21, 2016

(30) Foreign Application Priority Data

Oct. 2, 2013    (DE) .......... 10 2013 110 965

(51) Int. Cl.
*F25B 1/00*       (2006.01)
*B60H 1/00*       (2006.01)

(52) U.S. Cl.
CPC ......... *B60H 1/00028* (2013.01); *B60H 1/004* (2013.01); *B60H 1/0005* (2013.01);
(Continued)

(58) Field of Classification Search
CPC .................................. F24F 3/153; F25B 40/02
(Continued)

(56) References Cited

U.S. PATENT DOCUMENTS 4,065,936 A * 1/1978 Fenton .................... H01L 35/30
62/3.3
4,482,009 A * 11/1984 Nishimura ......... B60H 1/00842
165/100

(Continued)

FOREIGN PATENT DOCUMENTS

DE            10244954 A1       4/2003
EP             0913283 A1       5/1999
(Continued)

*Primary Examiner* — Melvin Jones
(74) *Attorney, Agent, or Firm* — Shumaker, Loop & Kendrick, LLP; James D. Miller

(57) ABSTRACT

An air conditioning system for conditioning the air of a passenger compartment of a motor vehicle comprises a housing with a first and a second flow conduit for conducting air and a coolant circuit with at least two heat exchangers, wherein a first heat exchanger is arranged in the first flow conduit and a second heat exchanger is arranged in the second flow conduit. The first heat exchanger can be operated independently of the operating mode as an evaporator and the second heat exchanger can be operated independently of the operating mode as a condenser. The housing comprises at least one air conduction device with which an air mass flow conditioned in the air conditioning system can be discharged into the environment. The coolant circuit is constructed with a heat exchanger which is arranged outside of the housing and can be operated as an evaporator or as a condenser.

16 Claims, 2 Drawing Sheets

(52) U.S. Cl.
CPC ..... *B60H 1/00057* (2013.01); *B60H 1/00328* (2013.01); *B60H 1/00392* (2013.01); *B60H 1/00564* (2013.01); *B60H 1/00921* (2013.01); *B60H 2001/00135* (2013.01); *B60H 2001/00178* (2013.01); *B60H 2001/00949* (2013.01)

(58) Field of Classification Search
USPC .............................. 62/90, 115, 119, 404, 426
See application file for complete search history.

(56) References Cited

U.S. PATENT DOCUMENTS 7,987,682 B2 * 8/2011 Reinders ............... F24F 5/0035
62/314
2005/0126772 A1 * 6/2005 Eberspach ......... B60H 1/00864
165/202

FOREIGN PATENT DOCUMENTS

| EP | 2072298 A1 | 6/2009 |
| FR | 2743027 A1 | 7/1997 |
| WO | 2012160735 A1 | 11/2012 |

* cited by examiner

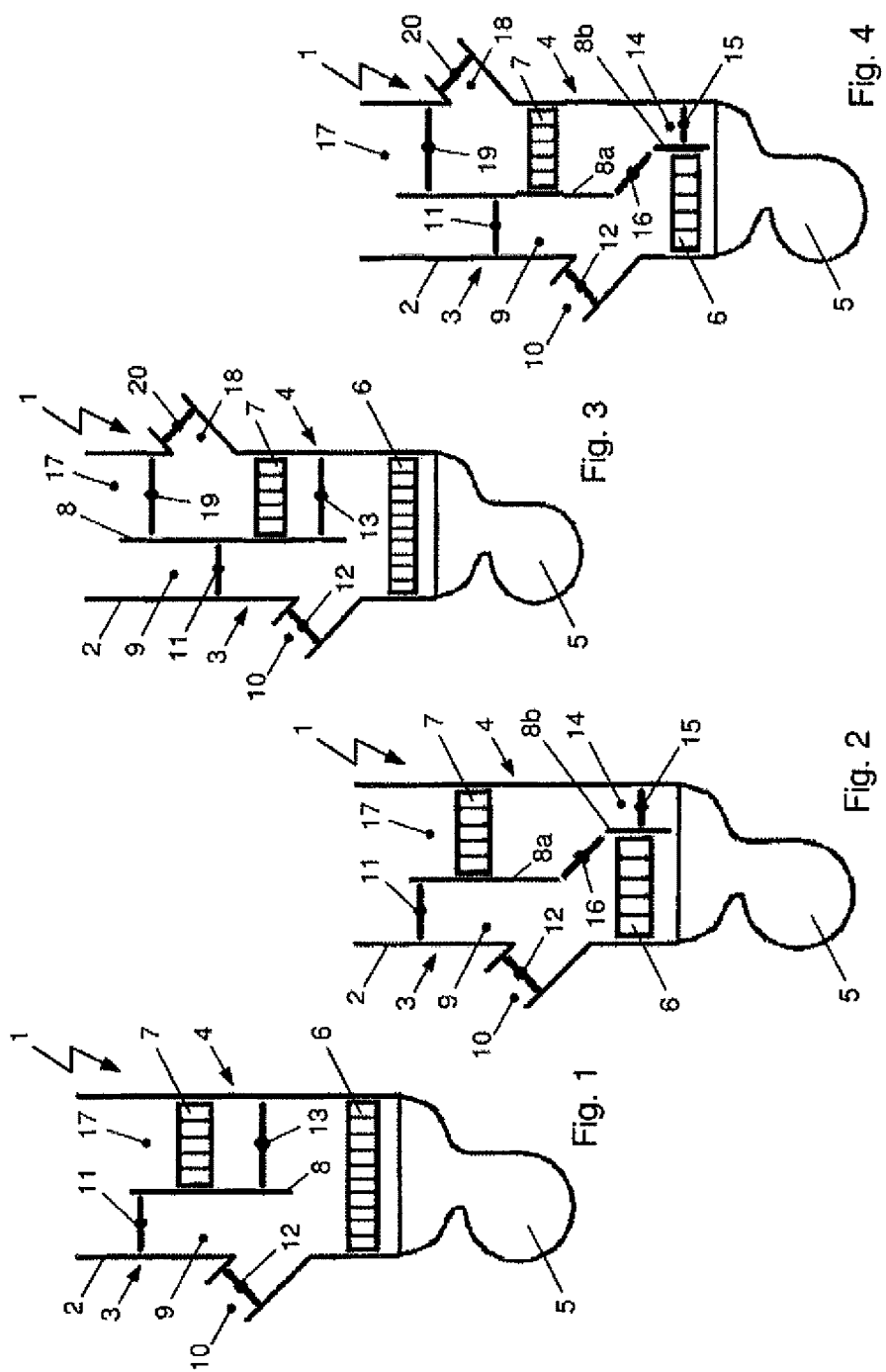

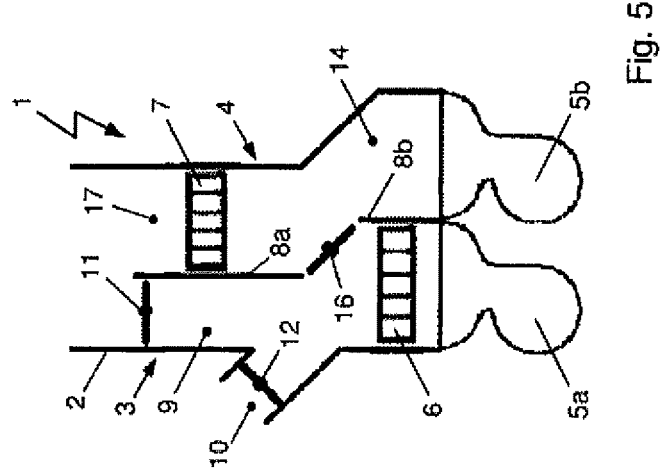

AIR-CONDITIONING SYSTEM FOR A MOTOR VEHICLE

CROSS-REFERENCE(S) TO RELATED APPLICATIONS

This patent application is a United States national phase patent application based on PCT/IB2014/064985 filed on Oct. 1, 2014, which claims the benefit of German Patent Application No. DE102013110965.9 filed on Oct. 2, 2013. The disclosures of the above patent applications are hereby incorporated herein by reference in their entirety.

FIELD OF THE INVENTION

The invention relates to an air conditioning system for conditioning the air of a passenger compartment of a motor vehicle. The air conditioning system comprises a housing with a first flow conduit and with a second flow conduit for conducting air and comprises a coolant circuit with at least two heat exchangers. A first heat exchanger is arranged in the first flow conduit and a second heat exchanger is arranged in the second flow conduit.

Furthermore, the invention relates to methods for operating the air conditioning system for a combined operation in the refrigerating system mode and the heat pump mode and for a reheating mode for conditioning the air of the passenger compartment in the reheating mode and in the heat pump mode.

BACKGROUND OF THE INVENTION

Air conditioning systems that have belonged for quite some time to the prior art condition the air to be introduced into the passenger compartment, wherein the heat required in the heat pump mode or in the reheating mode to heat the air mass flow is taken up from different heat sources.

Generic air conditioning systems with coolant-air heat exchangers that draw the heat performance from the coolant circuit of an efficient internal combustion engine of the vehicle drive no longer achieve on the one hand in the case of low ambient temperatures, for example less than −10° C., the temperature level required for a comfortable heating of the inner compartment of the vehicle. A similar situation applies for systems in vehicles with a hybrid drive. For these vehicles the use of additional heating concepts is necessary. On the other hand heat is withdrawn from the coolant so that the internal combustion engine is operated for a longer time at low temperatures, which has a negative effect on the emissions of exhaust gas and the fuel consumption. As a result of the intermittent operation of the internal combustion engine in hybrid vehicles, during rather long trips no sufficiently high coolant temperature is reached any longer. As a consequence, the start-stop operation of the internal combustion engine is stopped. The internal combustion engine is not turned off.

In addition, there is the trend to completely electrify the drive, such as, for example, in vehicles driven by batteries or fuel cells. Here, the waste heat of the internal combustion engine is removed as a possible heat source for the heating of the air.

Moreover, the amount of energy that can be stored in the vehicle battery is less than the amount of energy that can be stored in the form of liquid fuel inside the fuel tank. Therefore, in addition, the performance required for the air conditioning of the passenger compartment of an electrically driven vehicle has a significant influence of the range of the vehicle.

Air conditioning systems for motor vehicles for a combined operation in the refrigerating system mode and the heat pump mode for heating, cooling and dehumidifying the air to be supplied to the passenger compartment and conditioned are known from the prior art.

DE 102 44 954 A1 discloses a vehicle air conditioning system with a heat exchanger of a heat pump cooling cycle in a housing for an air conditioning system. The heat exchanger serves to heat or cool air that is flowing therethrough. The housing of the air conditioning system is constructed with a bypass conduit through which air flows to a flow-off side bypassing the heat exchanger.

Likewise, air conditioning systems with heat pump operation are known in which the evaporator is operated in the refrigerating system mode as well as in the heat pump mode as evaporator and the condenser is also operated in the refrigerating system mode as well as in the heat pump mode as condenser. The air conditioning systems are controlled from the coolant circuit side and/or the air side.

FR 2 743 027 A1 teaches a vehicle air conditioning system with a traditional coolant circuit comprising only an evaporator, a compressor, a condenser, and an expansion member. The heat exchangers are arranged in separate flow conduits constructed separately from each other at least as concerns the rheology. The flow conduits comprise cross connections or bypasses. The air mass flows drawn in by blowers are conducted by opening and closing flaps and by being conducted through the bypasses in accordance with the requirements and the operating mode over the surfaces of the heat exchangers. The air mass flows are cooled and/or dehumidified or heated at this time and subsequently brought into the passenger compartment and/or into the environment.

However, no operation in the reheating mode, also designated as reheat, is possible with the air conditioning systems controlled from the air side. The air conditioning systems constructed for an additional reheating operation have a complicated coolant circuit with a plurality of components such as heat exchangers, switching valves, and expansion valves.

In the "reheat" or reheating operation the air supplied to the passenger compartment is cooled down and dehumidified at this time and subsequently the dehumidified air is slightly heated. In this operating mode the required reheating performance is usually less than the required refrigerating performance for cooling and dehumidifying the air.

The air conditioning systems known from the prior art comprise a flow conduit through which fresh air is drawn in by suction from the environment or recirculated air from the passenger compartment upstream depending on the type of air inlet operation, and conditioned and conducted downstream through an air outlet switching device into the passenger compartment. However, the air conditioning systems have no air outlet flap with which the cooled-down or heated air can be brought into the environment of the air conditioning system or at least outside of the passenger compartment.

SUMMARY OF THE INVENTION

The present invention has the problem of making available an air conditioning system with heating functionality, especially for being used in motor vehicles. In addition, the system should be designed for the combined operation in the refrigerating system mode and the heat pump mode as well as in the reheating mode for heating, cooling, and dehumidifying the air of the passenger compartment to be conditioned. The operation should be possible to meet all requirements for a comfortable climate in the passenger compartment even in environments with low capacity heat sources such as, for example, in the case of energy-efficient internal combustion engines or hybrid drives consisting of an internal combustion engine and electromotor or in the case of non-present heat sources from the drive such as, for example, in the case of electrically driven motor vehicles.

The invention solves the problem by an air conditioning system for the conditioning of the air of a passenger compartment of a motor vehicle. The air conditioning system comprises a housing with a first and a second flow conduit for conducting air and a cooling circuit with at least two heat exchangers, wherein a first heat exchanger is arranged in the first flow conduit and a second heat exchanger is arranged in the second flow conduit.

According to the conception of the invention the air conditioning system is constructed for a combined operation in the refrigerating system mode and the heat pump mode for cooling and heating the passenger compartment as well as for a reheating mode. The first heat exchanger is constructed and can be operated independently of the operating mode as an evaporator and the second heat exchanger is constructed and can be operated independently of the operating mode as a condenser.

The housing comprises at least one air conduction device with which an air mass flow conditioned in the air conditioning system can be shunted into the environment.

The coolant circuit is constructed in accordance with the invention with a heat exchanger which is arranged outside of the housing and can be operated according to need and the operating mode as an evaporator or as a condenser.

Whereas the heat exchanger arranged in the first flow conduit is operated independently of the operating mode always as an evaporator and is accordingly constructed and the heat exchanger arranged in the second flow conduit is always operated independently of the operating mode as a condenser and is accordingly constructed, the third heat exchanger, which is arranged outside of the housing, is operated as needed and according to the operating mode either as an evaporator for receiving heat from the coolant or as a condenser for emitting heat from the coolant. Since the heat exchangers which can be operated exclusively as an evaporator or a condenser are arranged in the flow conduits and therefore inside the housing, they are designated as inner heat exchangers while the third heat exchanger is arranged outside of the housing and is consequently designated as an outer heat exchanger.

According to an advantageous embodiment of the invention the air conduction device and an additional cold air flow path are constructed on the first flow conduit in the direction of flow of the air after the evaporator. Therefore, a conditioned air mass flow conducted through the first flow conduit can be divided into partial air mass flows, wherein a first partial air mass flow can be conducted through a cold air flow path into the passenger compartment and a second partial air mass flow can be conducted through the additional cold air flow path into the environment of the housing.

A further development of the invention consists in that an air conduction device and an additional warm air flow path are constructed on the second flow conduit in the direction of flow of the air after the condenser. Therefore, a conditioned air mass flow conducted through the second flow conduit can be divided into partial air mass flows, wherein a first partial air mass flow can be conducted through a warm air flow path into the passenger compartment and a second partial air mass flow can be conducted through the additional warm air flow path into the environment of the housing.

As a result of the construction of the air conduction devices with additional cooled air flow path, respectively, an additional warm air flow path, a heated and/or a cooled-down air mass flow can be conducted either into the passenger compartment or otherwise into the environment of the housing, that is, out of the housing. For example, the air mass flows conditioned in this manner can be used in electric vehicles and hybrid vehicles for heating or cooling the batteries, fuel cells, or other drive components.

According to a preferred embodiment of the invention the evaporator, the condenser, and the heat exchanger arranged outside of the housing are constructed as coolant-air heat exchangers.

Consequently, the outer heat exchanger utilizes, in the case of the heat taken up by the coolant, the air as heat source or as a heat sink in the case of the emission of heat from the coolant to the air as a function of the need and the operating mode.

The air conditioning system is preferably constructed with at least one blower which delivers an air mass flow through the air conditioning system.

The air mass flow is conducted as a function of the operating mode through the first flow conduit or through the second flow conduit or the air mass flow is divided partially onto the first flow conduit and partially onto the second flow conduit.

According to an alternative embodiment the air conditioning system is constructed with two blowers which can be operated independently of one another, wherein a first blower delivers an air mass flow into the first flow conduit and a second blower delivers an air mass flow into the second flow conduit.

According to a further development of the invention a bypass conduit is constructed around the evaporator. The bypass conduit can advantageously be opened or closed with an air conduction device so that an air mass flow delivered by the blower can be conducted around the evaporator when the air conduction device is open. The bypass conduit preferably empties into the second flow conduit.

Each flow conduit can advantageously be loaded with fresh air from the environment, recirculated air from the passenger compartment, or a mixture of fresh air and recirculated air. The flow conduits are preferably arranged in such a manner that the directions of flow of the air mass flows are substantially identical in the direction of the passenger compartment.

A method in accordance with the invention for operating an air conditioning system for a combined operation in the refrigerating system mode and the heat pump mode for cooling and heating as well as for a reheating mode for the conditioning of the air of a passenger compartment of a motor vehicle comprises the following steps in the reheating mode:

Delivering an air mass flow into a housing of the air conditioning system,

Cooling down the air mass flow when flowing over an evaporator of a coolant circuit, Dividing the cooled-down air mass flow into a partial air mass flow which is conducted into the environment, into a partial air mass flow for the heating as well as into a cold air mass flow, wherein the cooled-down air mass flow is divided in a ratio between 0% and 100% and the amount of the partial air mass flow to the reheating is greater than 0%, Heating the partial air mass flow for reheating when flowing over a condenser of the coolant circuit, wherein the heat taken up in the evaporator from the coolant is given off partially in the condenser and in a heat exchanger arranged outside of the housing, Mixing the reheated partial air mass flow with the preconditioned cold air mass flow, and Introducing the mixed air mass flow into the passenger compartment.

Dividing the cooled-down air mass flow in a ratio of 0% or 100% with an amount of the partial air mass flow for reheating of more than 0% denotes that the amount of the air mass flow not conducted as a partial air mass flow for reheating is completely shunted into the environment or is completely conducted further as a cold air mass flow. Given a division deviating from 0% or 100%, an amount of the air mass flow not conducted as a partial air mass flow for reheating is shunted into the environment and an amount is conducted further as a cold air mass flow.

The mixing of the reheated partial air mass flow with the preconditioned cold air mass flow is consequently dependent on the ratio of the division of the cooled-down air mass flow into the partial air mass flow which is shunted into the environment and into the cold air mass flow. It is understood that the mixing of the reheated partial air mass flow with the preconditioned cold air mass flow takes place only in the instances in which the preconditioned cold air mass flow has an amount more than 0%.

An alternative method of the invention for operating an air conditioning system for a combined operation in refrigerating system mode and in heat pump mode for cooling and heating and for a reheating mode for conditioning the air of a passenger compartment of a motor vehicle comprises the following steps in the reheating mode:

Delivering a first and a second partial air mass flow in the housing of the air conditioning system, Cooling down the first partial air mass flow when flowing over an evaporator of a coolant circuit, Dividing the cooled-down first partial air mass flow into a partial air mass flow which is conducted into the environment, and into a partial air mass flow for reheating and into a cold air mass flow, wherein the cooled-down first partial air mass flow is divided in a ratio between 0% and 100%, Mixing the partial air mass flow for reheating with the second partial air mass flow, Heating the air mass flow mixed from the partial air mass flow for reheating with the second partial air mass flow when flowing over a condenser of the coolant circuit, wherein the heat taken up in the evaporator from the coolant is given off partially in the condenser and a heat exchanger arranged outside of the housing, Mixing the air mass flow heated during the flowing over of the condenser with the preconditioned cold air mass flow, and Introducing the mixed air mass flow into the passenger compartment.

Dividing the cooled-off first partial air mass flow at a ratio of 0% or 100% denotes that the entire cooled-down first partial air mass flow is shunted into the environment, forwarded as a partial air mass flow for reheating, or is forwarded as a cold air mass flow. At a division deviating from 0% or 100% a part of the cooled-down first partial air mass flow is conducted into the environment, conducted as a partial air mass flow to the reheating, and/or is conducted as a cold air mass flow. Again, an amount of the partial air mass flows can be zero.

The mixing of the partial air mass flow for reheating with the second partial air mass flow is consequently dependent on the ratio of the division of the cooled-down first partial air mass flow into the partial air mass flow which is shunted into the environment, into the partial air mass flow for reheating, and into the partial air mass flow. Of course, the mixing of the partial air mass flow for reheating with the second partial air mass flow takes place only in those instances in which the partial air mass flow for reheating has an amount of more than 0%. Even the subsequent heating during the flowing over the condensers of the coolant circuit accordingly refers to the air mass flow mixed from the partial air mass flow for the heating with the second partial air mass flow, respectively, to the unmixed, second partial air mass flow.

The mixing of the air mass flow heated during the flowing over the condenser with the preconditioned cold air mass flow is again dependent on the ratio of the division of the cooled-down, first partial air mass flow into the partial air mass flow which is shunted into the environment, into the partial air mass flow for reheating, and into the cold air mass flow. Of course, the mixing of the heated air mass flow with the preconditioned cold air mass flow only takes place in the instances in which the preconditioned cold air mass flow has an amount of more than 0%.

In the alternative methods in the reheating mode the heat taken up in the evaporator from the coolant is either given off again 100% in the condenser or a portion of the heat to be given off is removed by the heat exchanger arranged outside of the housing, wherein the amount is less than 100%.

The method according to the invention for operating an air conditioning system for a combined operation in the refrigerating system mode and the heat pump mode for cooling and heating and for a reheating mode for conditioning the air of a passenger compartment of a motor vehicle comprises the following steps in the heat pump mode:

Delivering a first partial air mass flow and a second partial air mass flow in the housing of an air conditioning system, Cooling down and/or dehumidifying the first partial air mass flow during the flowing over an evaporator of a coolant circuit, wherein the first partial air mass flow is drawn in by suction from the passenger compartment, Dividing the first partial air mass flow into a partial air mass flow that is shunted into the environment and into a partial air mass flow for being introduced into the passenger compartment, wherein the first partial air mass flow is divided at a ratio between 0% and 100%, Heating the second partial air mass flow during the flowing over a condenser of the coolant circuit, wherein the heat given off in the condenser by the coolant circuit is taken up in the evaporator and in a heat exchanger arranged outside the housing, Mixing the partial air mass flow for the introduction into the passenger compartment with the heated second partial air mass flow, and Introduction of the mixed air mass flow into the passenger compartment.

The dividing of the first partial air mass flow in a ratio of 0% or 100% denotes that the entire partial air mass flow is shunted into the environment or is introduced into the passenger compartment. Given a 0% or 100% deviating division a portion of the first partial air mass flow is conducted into the environment and a portion into the passenger compartment.

To sum up, the solution of the invention has various advantages:
- Efficient air conditioning system for simultaneous dehumidifying and heating,
- Rapid availability of warm air at low environmental temperatures and cold engine coolant water in motor vehicles with internal combustion engine,
- Reduction of the required performance for heating the passenger compartment by recirculated air operation and/or by purposeful conduction of air inside the flow conduits,
- Efficient operation in the warm pump mode by heating the coolant on the suction pressure side via ambient temperature, wherein the evaporator is loaded with partial recirculated air or recirculated air so that the temperature of the air in front of the evaporator is greater than the temperature of the ambient air,
- Discharge of air not needed in the passenger compartment into the environment, and
- Arrangement of the outer heat exchanger independently of the housing of the air conditioning system and therefore no influencing of the volume of the structural space of the housing.

DESCRIPTION OF THE DRAWINGS

Other details, features and advantages of the invention result from the following description of exemplary embodiments with reference made to the associated drawings. FIG. 1 to FIG. 4 show an air conditioning system with two flow conduits and cold air- and warm air flow paths and tube heat exchangers which can be operated as evaporators and condensers. Also, an air conditioning system is shown with:

FIG. 1: shows two air guidance flaps and one air exit flap in a cold air flow path, FIG. 2: shows two air guidance flaps, one air exit flap in a cold air flow path and in a bypass conduit around the evaporator with associated air guidance flap, FIG. 3: shows the three air guidance flaps and one air exit flap in a cold air flow path and in one warm air flow path, FIG. 4: shows three air guidance flaps, each with an air exit flap in a cold air flow path and in a warm air flow path and in a bypass conduit around the evaporator with associated air guidance flap, and FIG. 5: shows two independent blowers, two air guidance flaps, and one air exit flap in a cold air flow path.

WRITTEN DESCRIPTION OF THE INVENTION

FIG. 1 shows an air conditioning system 1 with a housing 2 comprising a first flow conduit 3 and a second flow conduit 4, wherein an air mass flow can be conducted through the first flow conduit 3 and also through the second flow conduit 4 with a blower 5. The flow conduits 3, 4 can be loaded with fresh air from the environment, recirculated air from the passenger compartment, or a mixture of fresh air and recirculated air.

An evaporator 6 of a coolant circuit that is not shown is arranged in the direction of flow of the air after the blower 5. After the evaporator 6, the air mass flow can be divided with the aid of air conduction devices 11, 12, 13 onto the flow conduits 3, 4. The first and the second flow conduits 3, 4 are separated from one another by a separating wall 8.

The air conduction device 11 serves to open and close a cold air flow path 9 extending through the first flow conduit 3. A certain amount of the air mass flow conditioned during the flowing over the evaporator 6 can be discharged from the air conditioning system 1 by the air conduction device 12. The air conduction device 13 serves to open and close the entrance into the second flow conduit 4. A condenser 7 of the coolant circuit is provided following the air conduction device 13 inside the second flow conduit 4. The evaporator 6 and the condenser 7 are constructed as air-loaded heat exchangers. The evaporator 6 takes in the entire cross section of flow of the flow conduits 3, 4. Evaporator 6 and condenser 7 are also designated as inner heat exchangers on account of the arrangement inside the flow conduits 3, 4 and therefore inside housing 2.

The blower 5 conducts the drawn-in air as an air mass flow to the evaporator 6. The air mass flow is cooled down and/or dehumidified when flowing over the heat exchange surfaces of the evaporator 6.

The cold air mass flow exiting from the evaporator 6 is conducted as a partial air mass flow through the first flow conduit 3 via the cold air flow path 9 in the direction of the passenger compartment, via the cold air flow path 10 into the environment of the air conditioning system 1, and/or through the second flow conduit 4 in the direction of the passenger compartment. The cold air mass flow is divided here into a required ratio or completely associated with one of the cold air flow paths 9, 10 or with the second flow conduit 4. The cold air mass flow is divided here by the air conduction devices 11, 12, 13 constructed as flaps.

The partial air mass flow is heated when flowing over the heat exchange surfaces of the condenser 7.

During the operation in the refrigerating system mode, that is, the cooling-down of the air to be supplied to the passenger compartment the air conduction devices 12, 13 are closed. The air conduction device 11 is aligned in such a manner that the air mass flow is conducted through the cold air flow path 9 to the passenger compartment. The cold air flow path 9 is open.

The blower 5 delivers the air to the evaporator 6. The air is cooled down and dehumidified and flows through the first flow conduit 3 through the cold air flow path 9 into the passenger compartment.

The heat taken up in the evaporator 6 from the coolant is given off in a heat exchanger, which is not shown, integrated in the coolant circuit. The heat exchanger operated in the refrigerating system mode as condenser is arranged outside of the housing 2. The arrangement of the heat exchanger, which uses the ambient air as a heat sink, on the front of the vehicle makes it possible for the heat exchange surface to be flowed over by the travel wind, which improves the process of heat exchange without the use of additional components such as fans. Based on the arrangement outside of the housing 2 the heat exchanger is also designated as an outer heat exchanger.

During the operation in the heat pump mode, that is, the heating of the air to be supplied to the passenger compartment, the air conduction devices 11, 12 are closed. The air conduction device 13 is open so that the air mass flow is conducted through the warm air flow path 17 to the passenger compartment. No heat is exchanged in the evaporator 6.

The heat given off to the air in the condenser 7 from the coolant is taken up in the outer heat exchanger, which is not shown and is operated in the heat pump mode as evaporator.

During the operation in the reheating mode the air conduction devices 11, 12, 13 are arranged as needed in different positions between completely open to completely closed.

The air mass flow is varied by the positions of the air conduction devices 11, 12, 13 and the speed of the blower 5.

When the air conduction devices 11, 13 are open, the partial air mass flow reheated when flowing over the heat exchange surface of the condenser 7 is mixed with the partial air mass flow of the cold air mass flow flowing through the cold air flow path 9. The partial air mass flow through the first flow conduit 3 can be regulated by adjusting the air control device 12. When the air conduction device 12 is open, the partial air mass flow through the first flow conduit 3 is reduced according to the position of the air conduction device 12. When the air conduction device 11 is closed, the air mass flow reheated when flowing over the condenser 7 is conducted unmixed into the passenger compartment. A part of the cold air mass flow conditioned when flowing over the evaporator 6 is shunted by the open air conduction device 12 through the cold air flow path 10 into the environment of the air conditioning system 1.

In addition to the exchange of heat in the evaporator 6 and in the condenser 7, additional heat can be exchanged in the outer heat exchanger, which is not shown and can also be operated as evaporator or condenser.

Whereas in FIG. 1 the air conditioning system 1 is shown with two air guidance flaps 11, 13 and one air exit flap 12 in the cold air flow path 10, FIG. 2 shows the air conditioning system 1 with two air guidance flaps 11, 16, the air exit flap 12 in the cold air flow path 10 and a bypass conduit 14 around the evaporator 6 with an associated air conduction device 15 constructed as an air guidance flap.

In distinction to the embodiment according to FIG. 1 the evaporator 6 does not extend over the entire cross section of flow of the flow conduits 3, 4 but rather the cross section of flow is divided into an area in which the evaporator 6 is arranged and into a bypass conduit 14 constructed parallel to it. The bypass conduit 14 can be closed by the air conduction device 15.

The first and the second flow conduits 3, 4 are separated from one another by a bipartite separating wall 8a, 8b. The first part of the separating wall 8a corresponds to the separating wall 8 from FIG. 1. The second part of the separating wall 8b delimits the bypass conduit 14 from the evaporator 6. The two partial segments of the separating wall 8a, 8b are connected to one another by an air conduction device 16 in such a manner that the air conduction device 16 also constructed as an air guidance flap seals the first and the second flow conduits 3, 4 rheologically to one another in the closed state in combination with the partial segments of the separating wall 8a, 8b.

During the operation in the refrigerating system mode the air conduction devices 12, 16 are closed. The air conduction device 11 is open so that the air mass flow transported by the blower 5 and conditioned when flowing over the evaporator 6 is conducted through the open cold air flow path 9 to the passenger compartment. The heat received during the evaporation of the coolant is given off again in the heat exchanger (not shown) operated as a condenser and arranged outside of the air conditioning system 1.

During the operation in the heat pump mode, that is, during the pure heating operation, the air conduction devices 11, 16 are closed. The air conduction devices 12, 15 are open, so that a first partial air mass flow transported by the blower 5 gives off heat to the coolant when flowing over the evaporator 6 and is subsequently brought through the cold air flow path 10 into the environment of the air conditioning system 1. The air mass flow consisting of recirculated air from the partial air mass flow and conducted via the evaporator 6, fresh air from the environment, or a mixture of recirculated air and fresh air serves here as a heat source. A second partial air mass flow is conducted through the bypass conduit 14 to the condenser 7, receives heat there, and is conducted into the passenger compartment.

Additional heat can be transferred to the coolant in the heat exchanger (not shown) arranged outside of the housing 2 of the air conditioning system and operated as an evaporator, which additional heat can be given off, if required, to the partial air mass flow to be heated for the passenger compartment.

Consequently, there is the possibility in the heat pump mode of receiving heat in the evaporator 6 as well as in the outer heat exchanger. The taking up of heat in the evaporator 6 therefore reduces the heat to be taken up from the environment in the outer heat exchanger and the associated danger of the icing of the heat exchanger.

In the heat pump mode the heat to be supplied for the evaporation of the coolant in the evaporator 6 can be partially taken up to 100% from the passenger compartment, given a low load and a correspondingly high temperature of the air in the passenger compartment. Here, the warm air is drawn as recirculated air from the passenger compartment by the blower 5 and transported via the evaporator 6. If the air mass flow drawn out of the passenger compartment is not sufficient in order to make the heat available to be supplied in the evaporator 6, the air mass flow drawn out of the passenger compartment is mixed with an air mass flow from the environment. The air mass flow that is drawn out of the passenger compartment or is mixed cools down and/or is dehumidified. The air mass flow conditioned in this manner can be conducted off into the environment as needed or returned into the passenger compartment. If the temperature of the air mass flow exiting from the evaporator 6 is higher than the temperature of the surrounding air, even the air mass flow transported through the first flow conduit 3 can be used for reasons of efficiency to heat the passenger compartment. Then the air mass flows transported through the first flow conduit 3 and the second flow conduit 4 are conducted into the passenger compartment.

In the heat pump mode, in order to take up evaporation heat from the air the evaporation temperature of the coolant must be at the most 5 K to 10 K less than the temperature of the air. Since the suction pressure in the coolant circuit is decisively given by the evaporation temperature of the coolant, a low evaporation temperature leads to a correspondingly low suction pressure.

If the heat for evaporating the coolant is taken up via the evaporator 6, there is the possibility of raising the temperature of the air in front of the evaporator 6 over the temperature of the surrounding air by mixing warm air from the passenger compartment with the fresh air from the surroundings. This raising of the temperature of the air in front of the evaporator 6 leads to a rise of the evaporation temperature of the coolant and therefore also of the suction pressure in the coolant circuit. The elevation of the suction pressure reduces the performance capacity of the compressor and raises the performance number and therefore also the efficiency of the coolant circuit and of the air conditioning system 1.

The pure heating operation with non-conditioned air is then engaged if a dehumidification of the air to be supplied to the passenger compartment is not required or not desired.

During the operation in the reheating mode the air conduction devices 11, 12, 15, 16 are arranged as needed in different positions between completely open to completely closed. The air mass flow to be heated up can be varied by the positions of the air conduction devices 11, 12, 15, 16 and the speed of the blower 5. The heat exchanger (not shown) can be operated as needed as evaporator or condenser.

In the case of open air conduction devices 11, 15 and closed air conduction device 16 the partial air flow heated when overflowing the heat transfer surface of the condenser 7 is mixed with the partial air mass flow of the cold air mass flow flowing through the cold air flow path 9. The partial air mass flow through the first flow conduit 3 can be regulated by adjusting the air conduction device 12. When the air conduction device 12 is open the partial air mass flow through the first flow conduit 3 is reduced according to the position of the air conduction device 12.

The air conditioning system 1 with heat pump functionality, that is, with the cooling down and/or dehumidifying as well as subsequent heating of the air mass flow, can be operated in the reheating mode, also designated as reheat operation. The reheating mode is possible as a pure reheating operation, that is, without the admixing of non-conditioned air. The entire air mass flow to be heated can be cooled down and/or dehumidified before the heating during the flowing over the heat transfer surface of the evaporator 6.

When the air conduction device 11 is closed and the air conduction device 16 is open, the air mass flow reheated when flowing over the condenser 7 is conducted into the passenger compartment. When air conduction device 15 is open the cold air mass flow preconditioned when flowing over the evaporator 6 can be mixed with the partial air mass flow conducted through the bypass conduit 14. A part of the cold air mass flow conditioned when flowing over the evaporator 6 is conducted away by the open air conduction device 12 through the cold air flow path 10 into the environment of the air conditioning system 1.

FIG. 3 shows a further development of the air conditioning system 1 according to FIG. 1 with two additional air conduction devices 19, 20 arranged inside the second flow conduit. The air conditioning system 1 according to FIG. 3 therefore comprises three air conduction devices 11, 13, 19 constructed as air guidance flaps and one air conduction device 12, 20 constructed as an air discharge flap in the cold air flow path 10 and in the warm air flow path 18. The air conduction device 13 arranged at the entrance into the second flow conduit 4 can also be eliminated.

The operation in the refrigerating system mode takes place in the same manner as the method described in FIG. 1. When the air conduction device 13 is eliminated, the air conduction devices 19, 20 are closed.

During the operation in the heat pump mode the air conduction devices 11, 12 are closed. The air conduction device 13 is, if present, open so that the air mass flow transported by the blower 5 flows through the second flow conduit 4 via the condenser 7 and is heated. No heat is transferred in the evaporator 6.

The air conduction device 20 is closed. The heated air mass flow is consequently conducted when air conduction device 19 is open through the warm air flow path 17 to the passenger compartment.

The heat to be given off in the condenser 7 from the coolant to the air is again taken up in the outer heat exchanger (not shown), which is operated in the heat pump mode as evaporator.

During the operation in the reheating mode the air mass flow to be heated is varied by the positions of the air conduction devices 11, 12, 13, 19, 20 as well as the speed of the blower 5, wherein the air conduction devices 11, 12, 13, 19, 20 can be arranged as required in different positions between completely open to completely closed.

In the case of open air conduction devices 11, 13, 19 the partial air mass flow reheated when flowing over the heat transfer surface of the condenser 7 is mixed with the partial mass flow of the cold air mass flow flowing through the cold aid flow path 9. The partial air mass flow conducted through the first flow conduit 3 can be regulated by adjusting the air conduction device 12 as in the method described for FIG. 1. When air conduction device 12 is open, the partial air mass flow is reduced by the first flow conduit 3 according to the position of the air conduction device 12.

When air conduction device 11 is closed and air conduction device 19 is open the air mass flow reheated when flowing over the condenser 7 is introduced unmixed into the passenger compartment. A part of the cold air mass flow conditioned when flowing over the evaporator 6 is removed by the open air conduction device 12 through the cold air flow path 10 into the environment of the air conditioning system 1.

Independently of the positions of the air conduction devices 11, 19, a reheated partial air mass flow can also be brought through the warm air flow path 18 into the environment of the air conditioning system 1 given at least one partially open air conduction device 20.

Consequently, the warm air mass flow exiting from the condenser 7 is divided into a partial air mass flow conducted via the warm air flow path 18 into the environment and into a partial air mass flow to be introduced via the warm air flow path 17 into the passenger compartment in a required ratio or is completely associated with one of the warm air flow paths 17, 18.

In addition to the transfer of the heat in the evaporator 6 and in the condenser 7, additional heat can again be taken up in the outer heat exchanger (not shown) that can be operated as an evaporator or a condenser or it can be given off.

FIG. 4 shows, in distinction to FIG. 2, the air conditioning system 1 with three air guidance flaps 11, 16, 17, the air discharge flaps 12, 20 in the cold air flow path 10 and in the warm air flow path 18 and with the air guidance flap 15 in the bypass conduit 14 around the evaporator 6.

During the operation in the refrigerating system mode either the air conduction devices 12, 15, 16 can be closed. If the air conduction device 11 is open, the air mass flow transported by the blower 5 and conditioned when flowing over the evaporator 6 is then conducted through the cold air flow path 9 to the passenger compartment. The heat taken up during the evaporation of coolant is given off again in the heat exchanger (not shown) outside of the air conditioning system 1.

Or the air conduction devices 12, 16 are closed while the air conduction device 15 is open. When the air conduction device 11 is open the air mass flow transported by the blower 5 and conditioned when flowing over the evaporator 6 is conducted through the cold air flow path 9 to the passenger compartment 2. There is now the possibility of using the condenser 7 in a supporting manner when giving of the heat removal heat and condensation heat to the air in addition to the outer heat exchanger (not shown). As a result of the distribution of the heat load to be given off to two heat exchangers and the associated increase of the heat transfer surface, a condensation temperature is adjusted in the coolant circuit that has a 5 K to 10 K lower difference from the temperature of the air than is the case with customary condensers with approximately 15 K. Since the high pressure is decisively determined in the coolant circuit by the condensation temperature of the coolant, the reduction of the condensation temperature results in a reduction of the high pressure of the coolant. The reduction of the high pressure reduces the performance capacity of the compressor, therefore raising the performance number and therefore also the efficiency of the coolant circuit and of the air conditioning system 1.

During the operation in the warm pump mode the air conduction devices 11, 16, 20 are closed. When the air conduction devices 12, 15, 19 are open a first partial air mass flow transported by the blower 5 that gives off heat to the coolant when flowing over the evaporator 6 is conducted through the cold air flow path 10 into the environment of the air conditioning system 1. A second partial air mass flow conducted through the bypass conduit 14 to the condenser 7 is conducted after taking up heat through the warm air flow path 17 into the passenger compartment.

In addition, heat can be transferred to the evaporating coolant in the outer heat exchanger (not shown), which heat can be given off as needed to the partial air mass flow to be heated for the passenger compartment.

During the operation in the reheating mode the air conduction devices 11, 12, 15, 16, 19, 20 are arranged as required in different positions between completely open to completely closed. The air mass flow to be warmed up can be adjusted by the positioning of the air conduction devices 11, 12, 15, 16, 19, 20 as well as by the speed of the blower 5.

When air conduction devices 11, 16, 19 are open the partial air mass flow reheated when flowing over the heat transfer surface of the condenser 7 after having cooled off and/or being dehumidified is mixed with the partial air mass flow of the cold air mass flow flowing through the cold air flow path 9. The partial air mass flow conducted through the first flow conduit 3 can be regulated by adjusting the air conduction device 12, as in the method explained for FIG. 1. The partial air mass flow through the first flow conduit 3 is reduced according to the position of the open air conduction device 12.

When air conduction device 11 is closed and air conduction devices 16, 19 are open, the air mass flow reheated when flowing over the condenser 7 is introduced unmixed into the passenger compartment. A part of the cold air mass flow conditioned when flowing over the evaporator 6 is conducted through the open air conduction device 12 through the cold air flow path 10 into the environment of the air conditioning system 1.

As was described for the embodiment according to FIG. 2, an additional air mass flow can be mixed with the cold air mass flow preconditioned when flowing over the evaporator 6 by opening the air conduction device 15 and when air conduction devices 11, 16, 19 are open as well as when air conduction device 11 is closed and air conduction devices 16, 19 are open. The mixed air mass flow is subsequently conducted to the condenser 7.

In addition, when air conduction devices 11, 15, 19 are open and air conduction device 16 is closed, the cold air mass flow cooled down when flowing over the evaporator 6 and/or dehumidified can be mixed with the warm air mass flow conducted through the warm air flow path 17 and heated when flowing over the condenser 7.

As was described for the embodiment according to FIG. 3, a reheated or heated partial air mass flow can also be removed through the warm air flow path 18 into the environment of the air conduction device system 1 independently of the positions of the air conduction devices 11, 19 given the at least partially open air conduction device 20.

Consequently, the warm air mass flow exiting from the condenser 7 is divided into a partial air mass flow conducted through the warm air flow path 18 into the environment and into a partial air mass flow to be conducted into the passenger compartment through the warm air flow path 17 in a required ratio or is completely assigned to one of the warm air flow paths 17, 18.

FIG. 5 shows an air conditioning system 1 with two independent blowers 5a, 5b, air conduction flaps 11, 16, and one air exit flap 12 in the cold air flow path 10. In distinction to the embodiment according to FIG. 2, the air conditioning system 1 in FIG. 5 comprises the second independent blower 5b instead of the air conduction device 15 in the bypass conduit 14.

The separately regulatable blowers 5a, 5b bring about an advantageous dynamic of the air conditioning system 1 since the first flow conduit 3 with the evaporator 6 and the second flow conduit 4 with the condenser 7 can be loaded with air mass flows with different speeds and therefore make possible a rapid reaction to changed operating states.

Refer to the comments regarding FIG. 2 for the methods of operating the air conditioning system 1 in the refrigerating system mode, heat pump mode, and the reheating mode.

LIST OF REFERENCE NUMERALS

1 Air conditioning system
2 Housing
3 First flow conduit
4 Second flow conduit
5, 5a, 5b Blowers
6 Evaporator
7 Condenser
8, 8a, 8b Separating wall
9 Cold air flow path
10 Cold air flow path exit
11 Air conduction device/air guidance flap of the cold air flow path 9
12 Air conduction device/air exit flap of the cold air flow path 10
13 Air conduction device/air guidance flap of the second flow conduit 4
14 Bypass conduit around evaporator 6
15 Air conduction device/air guidance flap of the bypass conduit 14
16 Air conduction device/air guidance flap between the first and the second flow conduit 3, 4
17 Warm air flow path
18 Warm air flow path exit
19 Air conduction device/air guidance flap of the warm air flow path 17
20 Air conduction device/air exit flap of the warm air flow path 18

The invention claimed is:
1. An air conditioning system for a vehicle comprising:
a housing with a first flow conduit and a second flow conduit for conducting air,
a first air conduction device configured to selectively shunt at least a portion of the air into an environment; and
a coolant circuit including a first heat exchanger arranged in the first flow conduit, a second heat exchanger arranged in the second flow conduit, and a third heat exchanger arranged outside of the housing and operable as one of an evaporator or a condenser;
wherein the air conditioning system is operable in a refrigerating system mode, a heat pump mode, and a reheating mode, wherein the first heat exchanger is operable independently of an operating mode of the air conditioning system as an evaporator and the second heat exchanger is operable independently of the operating mode of the air conditioning system as a condenser, wherein the first flow conduit is divided into a first cold air path and a second cold air path downstream of the first heat exchanger in a direction of flow of the air, wherein the first cold air path is configured to direct a first partial air mass flow of the air to the environment and the second cold air path is configured to direct a second partial air mass flow of the air to a passenger compartment of the vehicle, wherein the second flow conduit is divided into a first warm air path and a second warm air path downstream of the second heat exchanger in the direction of flow of the air, and wherein the first warm air path is configured to direct a third partial air mass flow of the air to the environment and the second warm air path is configured to direct a fourth partial air mass flow of the air to the passenger compartment of the vehicle.

2. The air conditioning system according to claim 1, wherein the first air conduction device is disposed in the first cold air path.

3. The air conditioning system according to claim 2, wherein the first air conduction device is adjustable between an open position allowing the first partial air mass flow to be discharged to the environment and a closed position blocking the first partial air mass flow from being discharged to the environment.

4. The air conditioning system according to claim 1, wherein a second air conduction device is disposed in the first warm air path.

5. The air conditioning system according to claim 4, wherein the second air conduction device is adjustable between an open position allowing the third partial air mass flow to be discharged to the environment and a closed position blocking the third partial air mass flow from being discharged to the environment.

6. The air conditioning system according to claim 1, wherein each of the first heat exchanger, the second heat exchanger, and the third heat exchanger are constructed as a coolant-air heat exchanger.

7. The air conditioning system according to claim 1, wherein a first blower is disposed upstream of the first heat exchanger in a direction of the flow of the air for conducting the air through the housing.

8. The air conditioning system according to claim 7, wherein the first blower delivers a first air mass flow into the first flow conduit and a second blower delivers a second air mass flow into the second flow conduit, wherein the first blower and the second blower are independently operable.

9. The air conditioning system according to claim 1, wherein a bypass conduit is provided around the first heat exchanger.

10. The air conditioning system according to claim 9, further comprising a second air conduction device disposed in the bypass conduit to selectively allow an air mass flow delivered by a blower to be conducted through the bypass conduit and around the first heat exchanger.

11. A method for operating an air conditioning system having a plurality of operating modes including a refrigerating system mode, a heat pump mode, and a reheating mode for conditioning air of a passenger compartment of a vehicle, the method comprising the following steps when in the reheating mode:

providing an air mass flow through a housing of the air conditioning system;

cooling the air mass flow when passing over an evaporator of a coolant circuit, the air mass flow transferring heat energy to a coolant of the coolant circuit;

dividing the air mass flow after passing over the evaporator, the air mass flow divided into a first partial air mass flow discharged into an environment, a second partial air mass flow for reheating, and a third partial air mass flow cooled in the evaporator;

heating the second partial air mass flow by passing over a condenser of the coolant circuit, wherein at least a portion of the heat energy transferred to the coolant in the evaporator is at least partially transferred to the condenser and a heat exchanger of the coolant circuit arranged outside of the housing;

mixing the reheated second partial air mass flow with the third partial air mass flow to form a mixed air mass flow; and introducing the mixed air mass flow into the passenger compartment of the vehicle.

12. The method according to claim 11, wherein each of the first partial air mass flow, the second partial air mass flow, and the third partial air mass flow includes between 0% and 100% of the air mass flow, and the second partial air mass flow for reheating includes greater than 0% of the air mass flow.

13. A method for operating an air conditioning system having a plurality of operating modes including a refrigerating system mode, a heat pump mode, and a reheating mode for conditioning air of a passenger compartment of a vehicle, the method comprising the following steps when in the heat pump mode:

providing a first partial air mass flow and a second partial air mass flow through a housing of the air conditioning system;

cooling the first partial air mass flow when passing over an evaporator of a coolant circuit, the first partial air mass flow transferring heat energy to a coolant of the coolant circuit;

dividing the first partial air mass flow after passing over the evaporator, the first partial air mass flow divided into a partial air mass flow discharged into an environment and a partial air mass flow for introduction into the passenger compartment;

heating the second partial air mass flow when passing over a condenser of the coolant circuit, wherein at least a portion of the heat energy transferred to the coolant in the evaporator is at least partially transferred to each of the condenser and a heat exchanger of the coolant circuit arranged outside of the housing;

mixing the partial air mass flow for introduction into the passenger compartment with the second partial air mass flow after passing over the condenser to form a mixed air mass flow; and introducing the mixed air mass flow into the passenger compartment of the vehicle.

14. The method according to claim 13, wherein the first partial air mass flow is further divided after passing over the evaporator to include a partial air mass flow for reheating, wherein the partial air mass flow for reheating passes over the condenser after mixing with the second partial air mass flow.

15. The method according to claim 14, wherein the partial air mass flow for reheating is mixed with the partial air mass flow for introduction into the passenger compartment and the second partial air mass flow after the partial air mass flow for reheating passes over the condenser, the mixed air mass flow including the partial air mass flow for reheating, the partial air mass flow for introduction into the passenger compartment, and the second partial air mass flow.

16. The method according to claim 13, wherein the first partial air mass flow is divided between the partial air mass flow discharged into the environment and the partial air mass flow for introduction into the passenger compartment at a ratio between 0% and 100%.

* * * * *